(12) United States Patent
Iguchi (10) Patent No.: US 9,878,667 B2
(45) Date of Patent: Jan. 30, 2018

(54) IN-VEHICLE DISPLAY APPARATUS AND PROGRAM PRODUCT

(71) Applicant: DENSO CORPORATION, Kariya, Aichi-pref. (JP)

(72) Inventor: Sei Iguchi, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 0 days.

(21) Appl. No.: 14/897,583

(22) PCT Filed: May 26, 2014

(86) PCT No.: PCT/JP2014/002741
§ 371 (c)(1),
(2) Date: Dec. 10, 2015

(87) PCT Pub. No.: WO2014/199574
PCT Pub. Date: Dec. 18, 2014

(65) Prior Publication Data
US 2016/0121794 A1 May 5, 2016

(30) Foreign Application Priority Data
Jun. 14, 2013 (JP) .................................. 2013-125597

(51) Int. Cl.
*B60R 1/00* (2006.01)
*B60K 35/00* (2006.01)
(Continued)

(52) U.S. Cl.
CPC ................ *B60R 1/00* (2013.01); *B60K 35/00* (2013.01); *B60R 11/04* (2013.01); *G02B 27/01* (2013.01);
(Continued)

(58) Field of Classification Search
CPC ................ G08G 1/166; G02B 27/01; G02B 2027/0138; G02B 2027/014;
(Continued)

(56) References Cited

U.S. PATENT DOCUMENTS

2009/0189753 A1  7/2009  Enya et al.
2009/0225434 A1* 9/2009  Nicholas .................. B60R 1/00
                                                   359/630
(Continued)

FOREIGN PATENT DOCUMENTS

JP    H10307545 A    11/1998
JP    2001023091 A    1/2001
(Continued)

OTHER PUBLICATIONS

International Search Report and Written Opinion (in Japanese with English Translation) for PCT/JP2014/002741, dated Aug. 19, 2014; ISA/JP.

*Primary Examiner* — Christopher E Leiby
(74) *Attorney, Agent, or Firm* — Harness, Dickey & Pierce, P.L.C.

(57) ABSTRACT

In an in-vehicle display apparatus, an obstacle recognition circuit recognizes an obstacle around a subject vehicle, and an image output circuit causes a display portion to display an obstacle image indicating the obstacle recognized by the obstacle recognition circuit in a predetermined displayable range at the lower portion on a windshield. This permits the obstacle to be viewed at a position to which a line of sight of the driver to the obstacle image is extended upward.

18 Claims, 5 Drawing Sheets

(51) Int. Cl.
*G02B 27/01* (2006.01)
*G08G 1/16* (2006.01)
*B60R 11/04* (2006.01)
*G06K 9/00* (2006.01)
*G06T 7/70* (2017.01)
*G06T 7/50* (2017.01)

(52) U.S. Cl.
CPC ............ *G06K 9/00805* (2013.01); *G06T 7/50* (2017.01); *G06T 7/70* (2017.01); *G08G 1/166* (2013.01); *B60K 2350/106* (2013.01); *B60R 2300/205* (2013.01); *B60R 2300/307* (2013.01); *B60R 2300/8093* (2013.01); *G02B 2027/014* (2013.01); *G02B 2027/0138* (2013.01); *G06T 2207/10016* (2013.01); *G06T 2207/10028* (2013.01); *G06T 2207/30261* (2013.01)

(58) Field of Classification Search
CPC ................. G06T 7/0051; G06T 7/004; G06T 2207/10016; G06T 2207/30261; G06T 2207/10028; G06K 9/00805; B60R 11/04; B60R 1/00; B60R 2300/8093; B60R 2300/307; B60R 2300/205; B60K 35/00; B60K 2350/106
See application file for complete search history.

(56) References Cited

U.S. PATENT DOCUMENTS

| | | | |
|---|---|---|---|
| 2009/0231116 A1 | 9/2009 | Takahashi et al. | |
| 2011/0301813 A1* | 12/2011 | Sun | B62D 15/029 701/41 |
| 2014/0002252 A1* | 1/2014 | Fong | B60Q 9/008 340/435 |

FOREIGN PATENT DOCUMENTS

| | | |
|---|---|---|
| JP | 2002019491 A | 1/2002 |
| JP | 2006276964 A | 10/2006 |
| JP | 2009190520 A | 8/2009 |
| JP | 2009196630 A | 9/2009 |
| JP | 2009205268 A | 9/2009 |
| JP | 2009217682 A | 9/2009 |
| JP | 2011240813 A | 12/2011 |
| JP | 2012063524 A | 3/2012 |

* cited by examiner

| DISPLAY COORDINATE OF LIQUID CRYSTAL PANEL | | 3D-INFO ABOUT OBSTACLE | | |
|---|---|---|---|---|
| X | Y | X | Y | Z |
| n | n | ⋮ | ⋮ | ⋮ |
| n | n-1 | ⋮ | ⋮ | ⋮ |
| n | n-2 | ⋮ | ⋮ | ⋮ |
| n | n-3 | ⋮ | ⋮ | ⋮ |
| N | n-4 | ⋮ | ⋮ | ⋮ |
| ⋮ | ⋮ | ⋮ | ⋮ | ⋮ |
| 0 | 2 | ⋮ | ⋮ | ⋮ |
| 0 | 1 | ⋮ | ⋮ | ⋮ |
| 0 | 0 | ⋮ | ⋮ | ⋮ |

FIG. 4D

IN-VEHICLE DISPLAY APPARATUS AND PROGRAM PRODUCT

CROSS REFERENCE TO RELATED APPLICATIONS

This application is a U.S. National Phase Application under 35 U.S.C. 371 of International Application No. PCT/JP2014/002741 filed on May 26, 2014 and published in Japanese as WO 2014/199574 A1 on Dec. 18, 2014. This application is based on and claims the benefit of priority from Japanese Patent Application No. 2013-125597 filed on Jun. 14, 2013. The entire disclosures of all of the above applications are incorporated herein by reference.

TECHNICAL FIELD

The present disclosure relates to an in-vehicle display apparatus and a program product that display images in a predetermined displayable range at the lower portion on the windshield of a vehicle.

BACKGROUND ART

There is known a display system in notification systems that transmit information about obstacles around vehicles to drivers, the displaying system reflecting an image-displaying light with a windshield to the driver's eyes to display a virtual image in front of the vehicle. The information is thereby transmitted to the driver.

Such a display system virtually displays a display image framing an obstacle that requires attention of the driver, if the obstacle is viewed through the windshield. The driver is thus permitted to understand a position of the obstacle (see Patent Literature 1).

PRIOR ART LITERATURES

Patent Literature

Patent Literature 1: JP 2009-196630 A (US 2009/189753 A1)

SUMMARY OF INVENTION

However, current display systems have a smaller displayable range for images than a field of view of the driver through the windshield, failing to frame an obstacle that is seen outside the displayable range. This may delay information transmission to the driver.

A wider displayable range may be provided to permit all the obstacles to be framed. However, when display images are virtually displayed in response to all scattered obstacles, the driver needs to follow the virtually displayed images with his/her eyes. The driver is therefore burdened with the attempt to obtain positions of all the obstacles. Additionally, in any time, the driver cannot previously obtain where the display images are virtually displayed. This may bring the driver a mental stress.

In the conventional configuration, the driver may have difficulty viewing obstacles due to display images, which are superimposed on the obstacles from the beginning.

The present disclosure is made in view of the above point. An object of the present disclosure is to provide a convenient in-vehicle display apparatus that enables a driver to easily obtain a correspondence between an image and obstacle that are displayed in a predetermined displayable range.

To achieve the above object, according to a first example of the present disclosure, an in-vehicle display apparatus mounted to a vehicle is provided to include a display portion, an obstacle recognition circuit, and an image output circuit. The display portion displays an image in a predetermined displayable range at a lower portion on a windshield of the vehicle. The obstacle recognition circuit recognizes an obstacle around the vehicle. The image output circuit makes the display portion display an obstacle image indicating the obstacle recognized by the obstacle recognition circuit in the displayable range. When displaying the obstacle image corresponding to the obstacle in the displayable range, the image output circuit determines a display position of the obstacle image based on an appearance of the obstacle viewed from a driver, and displays the obstacle image.

Such a configuration defines the appearance on the basis of a relative position of an obstacle in a front field of view or a line-of-sight direction of the driver. The obstacle can be therefore seen at a position to which a line-of-sight of the driver to the obstacle image is extended upwardly. When an obstacle image is displayed in a predetermined displayable range, an actual obstacle is located on the extension line of the line of sight of the driver to the obstacle image. The obstacle image functions as a guide to permit the driver to easily obtain the position of the actual obstacle by their easy eye movement and the correspondence between the display image and obstacle.

Since such a configuration enables the obstacle image to be displayed at the lower portion on the windshield of a vehicle, the display image is avoided from being superimposed on the actual obstacle. This can avoid the troublesomeness and risk that the obstacle is obscure due to the display image.

Such a configuration, which fixes the displayable range to the lower portion on the windshield of the vehicle, can reduce the mental stress related to the uncertainty about the image displayed positions. The driver can intuitively recognize the presence and number of obstacle images by moving their line of sight downward a little. This can reduce the burden to the driver.

Upon detecting (recognizing) any obstacle seen from the driver over the windshield, the above configuration immediately displays the corresponding obstacle image. The driver can thus obtain the correspondence between the display image and obstacle. This can avoid late information transmission to the driver.

The first example can provide the convenient in-vehicle display apparatus to enable the driver to easily obtain the correspondence between the image displayed in the predetermined displayable range and the obstacle.

According to a second example of the present disclosure, an in-vehicle display apparatus mounted to a vehicle is provided to include a display portion, an obstacle recognition circuit, and an image output circuit. The display portion displays images in a predetermined displayable range ahead of a driver's seat of the vehicle. The obstacle recognition circuit simultaneously recognizes a plurality of obstacles ahead of the vehicle. The image output circuit controls the display portion to display images that reduce and reproduce a relative positional relationship of the plurality of obstacles viewed from the driver's seat through a windshield of the vehicle in the displayable range by use of a plurality of obstacle images indicating the plurality of obstacles when the obstacle recognition circuit recognizes the plurality of obstacles.

That is, when a plurality of obstacle images are displayed in the displayable range located in front of the driver's seat of the vehicle, the display images reproduce a relative positional relationship or appearances of actual obstacles. The driver can therefore obtain the correspondence between each display image and each obstacle, and consequently, receive the information without delay.

The displayable range, which is fixed in front of the driver's seat of the vehicle, reduces the stress related to the image displayed positions; the driver moves their line of sight toward the displayable range to recognize the presence and number of the obstacle images intuitively. The burden to the driver is thus reduced.

Such a configuration achieves the convenient in-vehicle display apparatus in which the driver can easily obtain the correspondence between the image displayed in the predetermined displayable range and the obstacle.

It is noted that the present disclosure may be distributed to a market as program products. In specific, a program product is stored in a non-transitory computer-readable storage medium, the program product including an instruction to function a computer as the image output circuit of the in-vehicle display apparatus according to the first example, the computer being connected to a display portion that displays an image in a predetermined displayable range at a lower portion on a windshield of a vehicle and to an obstacle recognition circuit that recognizes an obstacle around the vehicle. Further, a program product may be stored in a non-transitory computer-readable storage medium, the program product including an instruction to function a computer as the obstacle recognition circuit and image output circuit of the in-vehicle display apparatus according to the first example, the computer being connected to a display portion that displays an image in a predetermined displayable range at a lower portion on a windshield of a vehicle.

These program products, built in the above computer, can acquire the effect equivalent to the effect obtained by the in-vehicle display apparatus of the above first example. The program products of the present disclosure may be stored in a ROM and a flash memory that are built in a computer, and loaded from the ROM and flash memory to the computer, or may be loaded to the computer via a network.

The above program products may be recorded in any type of computer-recordable recording medium. The recording mediums include a portable semiconductor memory (a USB memory and a memory card (registered trademark)).

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Embodiments of the present disclosure are described below in reference to the drawings.

<Entire Configuration>

First, an entire configuration of an in-vehicle display apparatus of this embodiment is explained in reference to the drawings.

Figure 1:
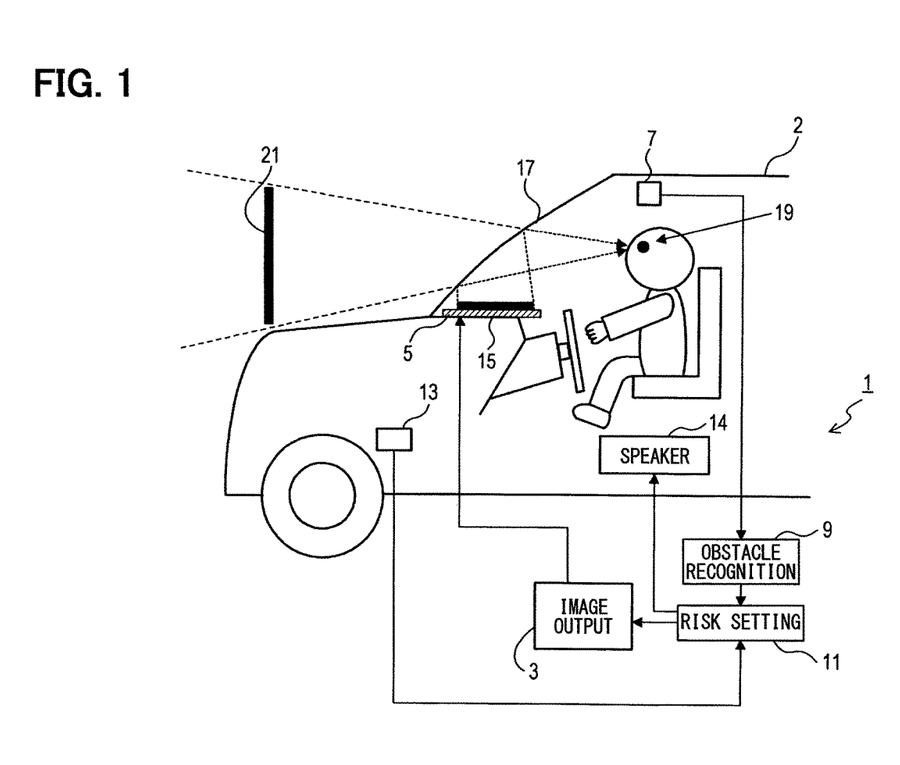
FIG. 1 is a diagram illustrating an entire configuration of an in-vehicle display apparatus.

As in FIG. 1, an in-vehicle display apparatus 1 is mounted to a subject vehicle 2 of a user (driver), and includes an image output circuit (image control device/means) 3, a liquid crystal panel (display portion or display device/means) 5, a camera 7, an obstacle recognition circuit (obstacle recognition device/means) 9, a risk setting circuit 11, a vehicle speed sensor 13, and a speaker 14.

The image output circuit 3 outputs image data to the liquid crystal panel 5, which is located to the upper portion of an instrument panel 15 and displays an image outputted from the image output circuit 3. The light displaying the image outputted from the liquid crystal panel 5 is reflected by the windshield 17, and enters a viewpoint 19 of the driver. Consequently, a virtual image 21 of the image displayed on the liquid crystal panel 5 is displayed away from the windshield 17 by a predetermined distance forwardly of the vehicle, as viewed from the driver.

As in FIG. 2, the image output circuit 3 and liquid crystal panel 5 can display the virtual image 21 (hereinafter also called an "obstacle image 33") indicating the presence of an obstacle at a position to which a line of sight of the driver to the obstacle around the subject vehicle 2 (particularly in front of the subject vehicle 2) is vertically moved downward in a predetermined displayable range at the lower portion on the windshield 17 of the subject vehicle 2. The image output circuit 3 and liquid crystal panel 5 can change a color tone of the virtual image 21 to various ones. The displayable range for the virtual images 21 is set smaller than a field of view of the driver through the windshield 17 not to interfere with driving. The virtual image 21 transmitted from a fixed place (a combiner may be attached to the windshield 17) at the lower portion on the windshield 17 is displayed in the displayable range.

The camera 7 captures videos ahead of the subject vehicle 2 (hereinafter "front video"). The camera 7 is a stereo camera that simultaneously images ahead of the subject vehicle 2 from a plurality of different directions to acquire the information about the depth direction, and is installed near the viewpoint 19 of the driver in the cabin of the subject vehicle 2. The obstacle recognition circuit 9 determines whether an obstacle (for example, a different vehicle 23) is present in the front video captured by the camera 7. When the obstacle is present, the obstacle recognition circuit 9 calculates a direction of the obstacle (viewed from the viewpoint 19), a distance to the obstacle (from the subject vehicle 2), and a size of the obstacle. The calculations are performed to each obstacle when a plurality of obstacles are recognized, and performable by a known image recognition technology using a shape, movement, and brightness of each obstacle.

The vehicle speed sensor 13 detects a speed of the vehicle, and outputs the result to the risk setting circuit 11. The speaker 14 is installed in the cabin of the subject vehicle 2, and can output an alarm in response to a risk setting result of the risk setting circuit 11. The risk setting circuit 11 sets a risk of an obstacle recognized by the obstacle recognition circuit 9. Specifically, the risk setting circuit 11 calculates an arrival time of the subject vehicle 2 to the obstacle on the basis of a vehicle speed of the subject vehicle 2 acquired from the vehicle speed sensor 13 and a distance to the obstacle, and determines that an alarm is necessary to set a risk when the arrival time is shorter than a predetermined threshold.

<Processing by in-vehicle Display Apparatus>

Next, the processing performed by the in-vehicle display apparatus of this embodiment is explained in reference to the drawings. In this embodiment, the image output circuit 3 and obstacle recognition circuit 9 are each structured by one or more computers. Based on the programs in the ROM, the CPU uses the RAM as a work area to perform the following display control processes. These various processes may be realized as a configuration of hardware including one or more ICs. This display control processing is started by a turn-ON of the engine of the subject vehicle 2.

Figure 3:
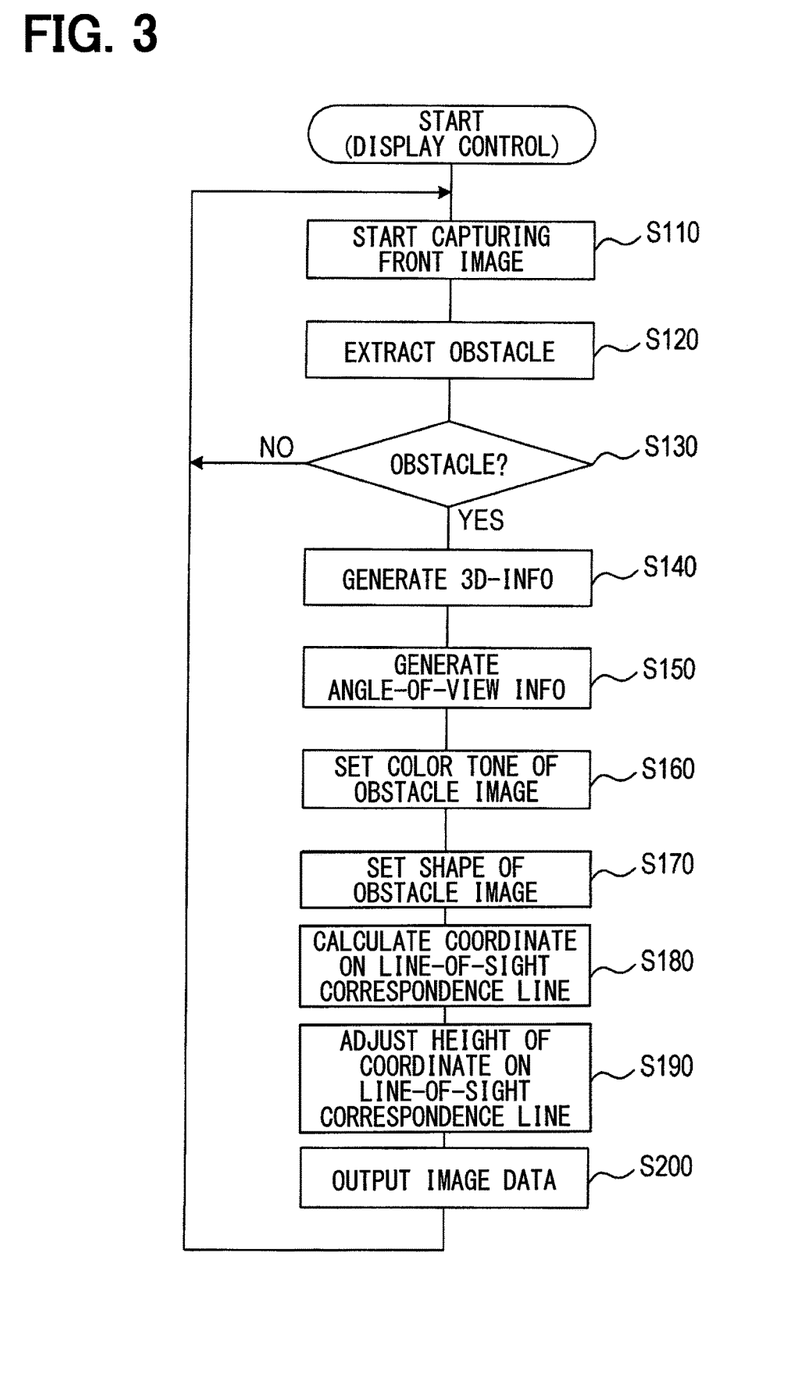
FIG. 3 is a flowchart to explain processing (display control processing) performed by the in-vehicle display apparatus.

As in FIG. 3, when the display control processing is started at S110, the camera 7 starts capturing the front video of the subject vehicle 2.

At S120, the obstacle recognition circuit 9 extracts an obstacle from the front video acquired from the camera 7 at S110. This extraction is realized by a known pattern-matching technology previously storing shapes, sizes, and colors of specific obstacles (different vehicles, pedestrians), and when an element similar to the obstacles is present in the front image, the element is extracted as an obstacle.

At S130, the obstacle recognition circuit 9 determines at S120 whether the obstacle has been extracted from the front video. The flowchart proceeds to S140 when the obstacle has been extracted, and returns to S110 when no obstacle has been extracted.

At S140, the obstacle recognition circuit 9 calculates a direction of the extracted obstacle (direction to the obstacle viewed from the viewpoint 19), an obstacle distance (distance from the subject vehicle 2 to the obstacle), and a size of the obstacle. By use of a known stereo correlation method, this calculation is realized by converting the front image from the camera 7 into three-dimensional information to generate three-dimensional coordinate information that indicates the position of the obstacle. The obstacle recognition circuit 9 outputs this three-dimensional coordinate information to the image output circuit 3.

At S150, the obstacle recognition circuit 9 calculates an angle of view of the obstacle viewed from the viewpoint 19 on the basis of the size of the obstacle and the obstacle distance that are calculated at S140. This calculation is realized by using a distance conversion table that converts the obstacle distance into the distance from the viewpoint 19 to the obstacle to find a tangent between the converted distance and each of a height and width of the obstacle. Based on this value, the obstacle recognition circuit 9 generates the information about the size (height and width) of the obstacle projected on the eyes of the driver, that is, about the size (height and width) of the obstacle viewed from the driver through the windshield 17, and outputs the information to the image output circuit 3. The distance conversion table is stored in a storage apparatus such as a CPU-readable ROM.

At S160, the image output circuit 3 sets a color tone of the obstacle image 33 in response to a type (different vehicle and pedestrian) and color of the obstacle extracted at S120 by the obstacle recognition circuit 9. When the type of obstacle is a pedestrian, the color tone of the obstacle image 33 may be set darker than a different vehicle. When the type of obstacle is a different vehicle, the color tone of the obstacle image 33 may be set similarly to the color of other different vehicles.

At S170, on the basis of the angle-of-view information inputted from the obstacle recognition circuit 9 at S150, the image output circuit 3 sets the shape of the obstacle image 33 whose color tone has been set at S160. This setting is realized using a shape correspondence table in which the angle-of-view information (the height and width of the obstacle viewed from the driver through the windshield 17) corresponds to the shape (height and width) of the obstacle image 33 to find the shape of the obstacle image 33 corresponding to the angle-of-view information. The shape correspondence table is stored in a storage apparatus such as a CPU-readable ROM.

At S180, based on the three-dimensional information inputted from the obstacle recognition circuit 9 at S140, the image output circuit 3 calculates the intersection between the direction of the obstacle (the direction of the obstacle viewed from the viewpoint 19 and also the line-of-sight direction) and a surface (hereinafter "virtual image display surface") that indicates the displayable range of the virtual image 21 at a position away from the windshield 17 by a predetermined distance (about 2 m). Actually, the displayable area is located below, and in many cases, the line of sight to the obstacle does not intersect but is above the virtual image display surface. In this case, the intersection between the line to which this line of sight has vertically moved downward and the uppermost edge of the virtual display surface is calculated. In detail, a virtual plane extending vertically downward from the line of sight to the obstacle is drawn, and the first intersection between the virtual plane and virtual display surface is calculated. That is, a coordinate (hereinafter called a "coordinate on the line-of-sight correspondence line") of the intersection between the line (called a line-of-sight correspondence line) moved from the line of sight of the driver to the obstacle and the uppermost edge of the virtual display surface is calculated.

At S190, the image output circuit 3 variably set the height direction of the coordinate on the line-of-sight correspondence line calculated at S180 in response to the obstacle distance calculated at S140 by the obstacle recognition circuit 9. When the obstacle distance is large, the height of the coordinate on the line-of-sight correspondence line is raised. When the obstacle distance is small, the height of the coordinate on the line-of-sight correspondence line is lowered.

Finally, at S200, the image output circuit 3 generates image data to display the obstacle image that has been set at S160 and S170 at the coordinate on the line-of-sight correspondence line that has been set at S190, and outputs the image data to the liquid crystal panel 5.

Figure 2:
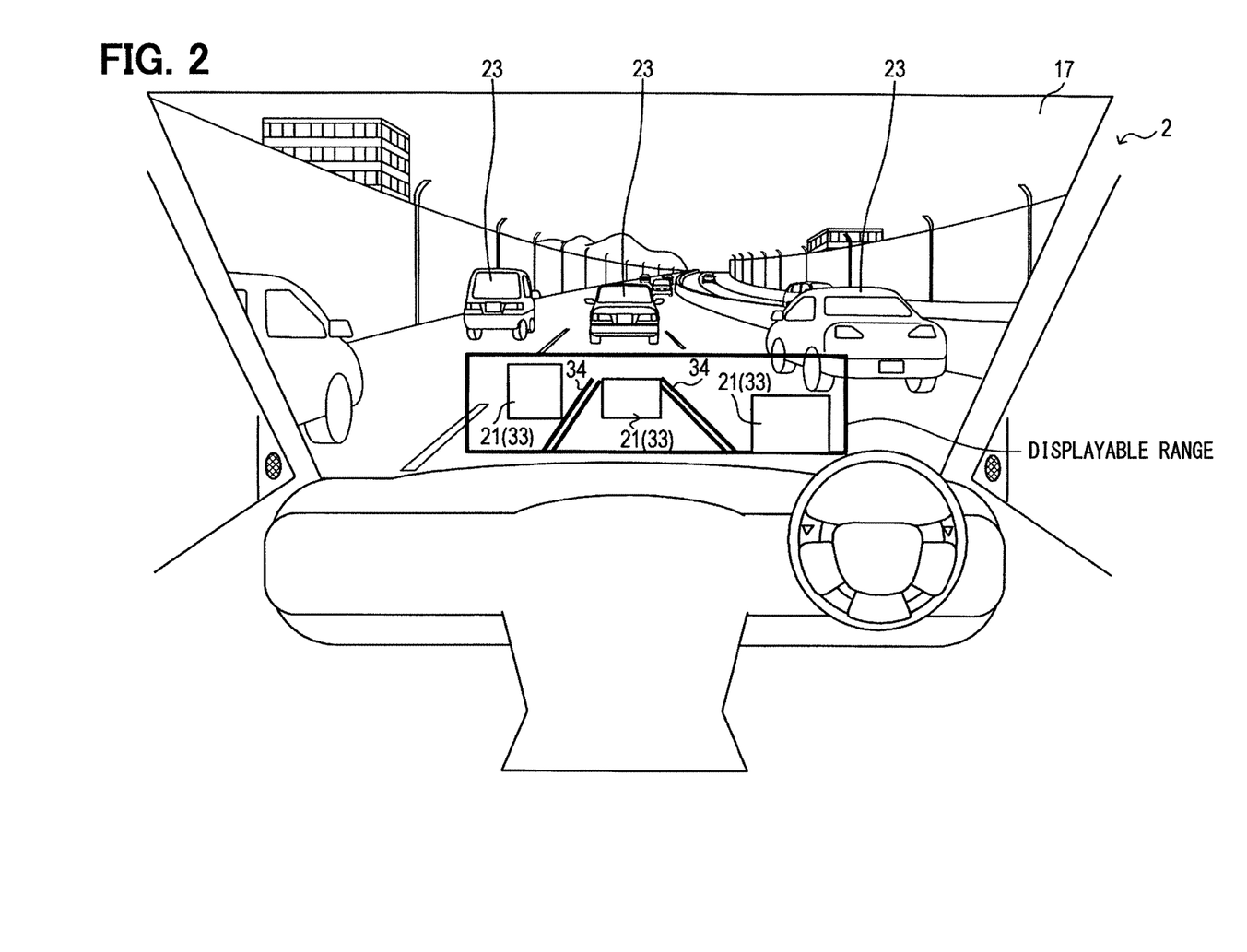
FIG. 2 is a diagram explaining virtual images (obstacle images) displayed by the in-vehicle display apparatus and viewed forward of a driver's viewpoint.

As in FIG. 2, the virtual image 21 (obstacle image 33) displayed based on this image data is displayed at a position on the line-of-sight correspondence line corresponding to the line of sight to the obstacle (different vehicle 23 in FIG. 2) viewed from the driver. Thereby, when a plurality of different vehicles 23 are viewed from the driver through the windshield 17, a plurality of obstacle images 33 respectively indicating these different vehicles 23 are displayed to reproduce the relative positional relationship between these different vehicles 23. The obstacle image 33 is displayed at a size based on the angle of view of the obstacle (different vehicle 23 in FIG. 2) viewed from the driver, that is, the size (height and width) of the obstacle viewed from the driver through the windshield 17. As viewed from the subject vehicle 2 (and the driver), the obstacle image 33 is displayed at a higher position when corresponding to a farther obstacle, and displayed at a lower position when corresponding to a nearer obstacle. White line images 34 indicating a road being traveled on can also be displayed as the virtual image 21 together with the obstacle image 33.

Figure 4A:
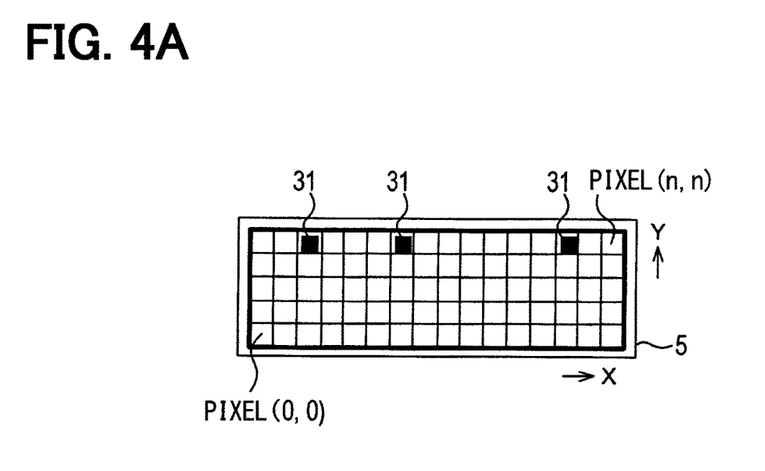
FIG. 4A illustrates a display coordinate of an obstacle on a liquid crystal panel.
Figure 4B:
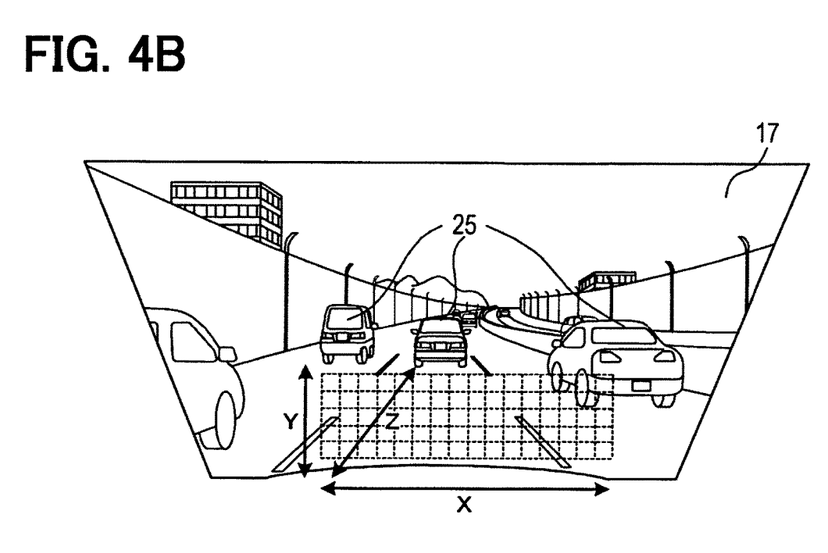
FIG. 4B illustrates positions of the obstacles.
Figure 4C:
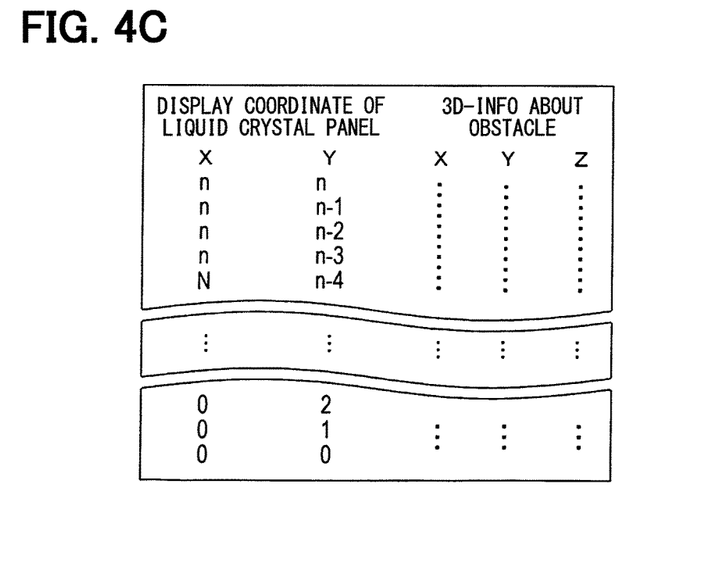
FIG. 4C illustrates a relationship between the positions of the obstacles and the display coordinates on the liquid crystal panel.
Figure 4D:
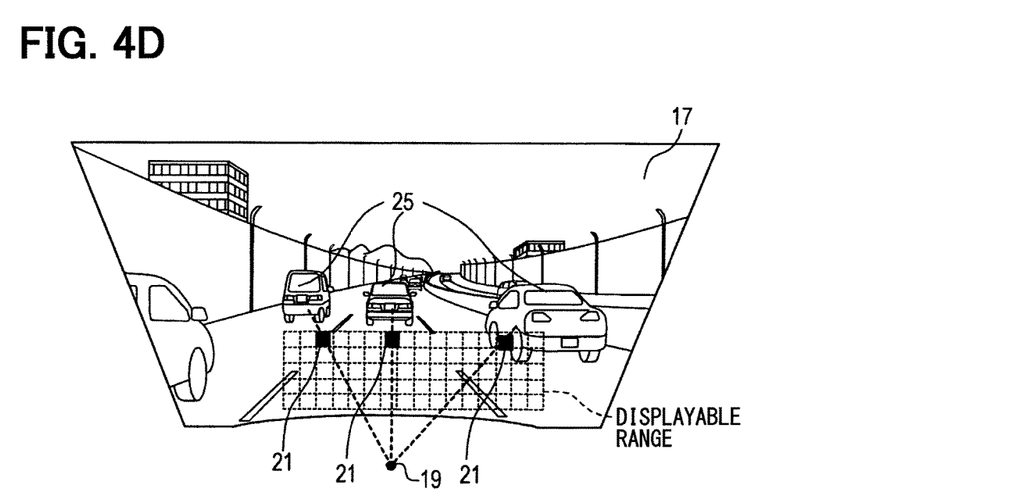
FIG. 4D illustrates the liquid crystal panel virtually displayed on a windshield.

Thus, in the display control processing, the three-dimensional information indicating the position of the obstacle is generated by the obstacle recognition circuit 9. As in FIG. 4B, this three-dimensional information indicates the direction of the obstacle 25 on the basis of the combination of the coordinate in the X direction (vehicle width direction), coordinate in the Y direction (vehicle height direction), and coordinate in the Z direction (depth direction). As in FIG. 4C, an unshown storage portion (a ROM) of the in-vehicle display apparatus 1 stores the coordinate correspondence table of the three-dimensional information about the obstacles 25 generated by the obstacle recognition circuit 9 and the display coordinates on the liquid crystal panel 5. As in FIG. 4A, when a display 31 is displayed on the liquid crystal panel 5 at the display coordinate extracted from the above coordinate correspondence table, the position of the virtual image 21 generated by the display 31 is, as shown in FIG. 4D, on the line-of-sight correspondence line corresponding to the line-of-sight of the driver to the obstacle 25 (at the coordinate on the line-of-sight correspondence line).

The image output circuit 3 calculates, on the liquid crystal display 5, the coordinate on the line-of-sight correspondence line corresponding to the obstacle 25 by use of the three-dimensional information generated by the obstacle recognition circuit 9 and the above coordinate correspondence table, and variably sets the Y direction (vehicle height direction) of this coordinate in response to the obstacle distance. The obstacle image 33 whose color tone and size have been set beforehand is thereby displayed on the line-of-sight correspondence line corresponding to the line-of-sight of the driver to the obstacle 25.

<Effect>

As explained, in the in-vehicle display apparatus 1, the obstacle recognition circuit 9 recognizes the obstacle 25 around the subject vehicle 2, and the image output circuit 3 displays the obstacle image 33 indicating the obstacle 25 recognized by the obstacle recognition circuit 9 at the position corresponding to the line-of-sight correspondence line of the driver to the obstacle 25 in the predetermined displayable range of the lower portion on the windshield 17. That is, based on the appearance of the obstacle viewed from the driver or the relative position of the obstacle in the front field of view, the display position of the obstacle image is determined, and the obstacle image is displayed.

In such a configuration, when the obstacle image 33 is displayed in the predetermined displayable range, the actual obstacle 25 is positioned on the extension line of the line-of sight of the driver to the obstacle image 33. The obstacle image 33 therefore functions as a guide to enable the driver to understand the position of the actual obstacle 25 and the correspondence between the obstacle image 33 and the obstacle 25 by easy movement of their eyes.

The obstacle image 33 is virtually displayed at the lower portion on the windshield 17. The obstacle image 33 is thus prevented from being superimposed on the actual obstacle to avoid the troublesomeness and risk that the actual obstacle is obscured by the obstacle image 33.

The displayable range is fixed at the lower portion on the windshield 17. The mental stress related to the uncertainty about the image displayed positions can be thus reduced. Additionally, the driver can instinctively recognize the presence and number of the obstacle images 33 by moving their line-of-sight downward a little. The burden to the driver can be thus reduced.

The obstacle image 33 corresponding to any obstacle 25 viewed from the driver through the windshield 17 is displayed immediately when the obstacle 25 is detected (recognized). The driver can thus obtain the correspondence between the obstacle image 33 and obstacle 25 to avoid the delay of information transmission to the driver.

Therefore, according to the in-vehicle display apparatus 1, the driver can easily understand the correspondence between the obstacle image 33 and obstacle 25 that are displayed in the predetermined displayable range, and the convenient system can be structured. The system including the in-vehicle display apparatus 1 includes a well-known autocruise control system and a keep-lane control system. According to the in-vehicle display apparatus 1, the driver can preferably receive the detection (recognition) of the obstacle 25 in these systems.

In the in-vehicle display apparatus 1, the obstacle recognition circuit 9 simultaneously recognizes the obstacles 25 ahead of the subject vehicle 2. Then, the image output circuit 3 displays the plurality of obstacle images 33 indicating the plurality of obstacles 25 recognized by the obstacle recognition circuit 9 in the displayable range at the lower portion on the windshield 17. In this case, by use of the plurality of obstacle images 33 indicating the plurality of obstacles 25, the image output circuit 3 controls the appearances of the obstacles 25 viewed from the driver's seat through the windshield 17 of the subject vehicle 2, that is, the display of the liquid crystal panel 5 to reproduce the relative positional relationship in the displayable range.

That is, in such a configuration, when the obstacle images 33 are displayed in the displayable range ahead of the driver's seat of the subject vehicle 2, these display images reproduce the relative positional relationship between the actual obstacles 25. Therefore, the driver can easily obtain the correspondence between each display image and each obstacle 25, and consequently, the delay of the information transfer to the driver can be avoided.

The displayable range is fixed ahead of the driver's seat of the subject vehicle 2. The stress related to the uncertainty about the image displayed positions can be thus reduced. Additionally, the driver can instinctively recognize the presence and number of obstacle images by moving their line of sight to the displayable range. The burden to the driver can be thus reduced.

Therefore, the driver can obtain the correspondence between the obstacle image 33 and obstacle 25 that are displayed in the predetermined displayable range, and the convenient system can be structured.

In the in-vehicle display apparatus 1, the light displaying the image is reflected by the windshield 17 (or a combiner), and outputted to the eyes of the driver, and the obstacle image 33 is displayed using a head-up display that outputs an image to the driver's eyes and displays the image as a virtual image ahead of the subject vehicle 2. The driver can thus recognize the obstacle image 33 without averting their eyes from the windshield 17 during driving. The convenience can be therefore improved.

In the in-vehicle display apparatus 1, to display the obstacle image 33 at the size corresponding to the angle of view of the obstacle 25 viewed from the driver, the size of the obstacle image 33 is changed in response to the size of the obstacle 25 reflected by the eyes of the driver. Therefore, the driver can intuitively sense the distance to the obstacle 25 on the basis of the size of the obstacle image 33. When the obstacle images 33 are displayed in response to all the scattered obstacles 25, the driver can intuitively sense the distances relative to the obstacles 25 on the basis of the different sizes of the obstacle images 33.

In the in-vehicle display apparatus 1, the image output circuit 3 changes the size of the obstacle image 33 in response to the actual size of the obstacle 25 to display the obstacle image 33 at the size corresponding to the height and width of the obstacle 25. The driver can recognize the size of the obstacle 25 intuitively from the size of the obstacle image 33.

Specifically, in the in-vehicle display apparatus 1, the image output circuit 3 displays the obstacle image 33 at the size corresponding to the angles of view in the height and width directions of the obstacle 25 viewed from the driver. The driver can intuitively understand the information about both the sense of distance to and the size of the obstacle 25 on the basis of the size of the obstacle image 33.

In the in-vehicle display apparatus 1, since the image output circuit 3 displays the obstacle image 33 of the color tone corresponding to the obstacle 25, the correspondence between the obstacle image 33 and the actual obstacle 25 can be easily understood on the basis of the color tone of the obstacle image 33.

In the in-vehicle display apparatus 1, the image output circuit 3 variably sets the display position of the obstacle image 33 in response to the distance between the subject vehicle 2 and obstacle 25. Specifically, the height of the obstacle image 33 in the displayable range is changed in response to the distance to the obstacle 25 to raise the display position of the image corresponding to a distant obstacle and to lower the display position of the image corresponding to a near obstacle. The sense of distance to the obstacle 25 can be therefore displayed more intelligibly.

<Another Embodiment>

As mentioned, the embodiment of the present disclosure has been described. The present disclosure is not limited to the above embodiment but can be carried out in various modes without departing from the content of the present disclosure.

The in-vehicle display apparatus 1 of the above embodiment generates various informations about the obstacles on the basis of the front video the obstacle recognition circuit 9 captures using the camera 7, but this does not limit the present disclosure. The various informations about the obstacles may be generated based on the information acquired from a known radar apparatus instead of the camera 7.

In the display control processing of the above embodiment, the height of the obstacle image 33 in the displayable range is changed based on the distance to the obstacle 25 to raise the display position of the image corresponding to a distant obstacle and to lower the display position of the image corresponding to a near obstacle, but this does not limit the present disclosure. The display position may be variably set to move the image corresponding to the near obstacle and to thereby alert the driver.

The above embodiment uses the system of the head-up display to virtually display the obstacle image 33 at the lower portion of the windshield 17, but this does not limit the present disclosure. The system may include any that displays images at the lower portion on the windshield 17 (in detail, that displays images in the predetermined displayable range ahead of the driver's seat of the subject vehicle 2), such as a general liquid display provided in front of the windshield (ahead of the driver's seat) and a film display (display apparatus). The system may also include one that displays images at the lower portion not only on the windshield 17 but also on any windshield of the subject vehicle 2, such as the rear windshield and side windshield. While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An in-vehicle display apparatus mounted to a vehicle, comprising:
  a display portion that displays an image in a predetermined displayable range at a lower portion on a windshield of the vehicle;
  an obstacle recognition circuit that recognizes, as a recognized obstacle, an obstacle ahead of the vehicle; and
  an image output circuit that makes the display portion display an obstacle image indicating the recognized obstacle recognized by the obstacle recognition circuit in the displayable range,
  wherein:
  when displaying the obstacle image corresponding to the recognized obstacle in the displayable range, the image output circuit determines a display position of the obstacle image based on an appearance of the recognized obstacle viewed from a driver, and displays the obstacle image; and
  the image output circuit displays the obstacle image by setting a color tone of the obstacle image depending on a color of the recognized obstacle.

2. The in-vehicle display apparatus according to claim 1, wherein the display portion permits a light displaying the image to be reflected by the windshield or a combiner and outputted to eyes of the driver, and displays the image as a virtual image ahead of the vehicle.

3. The in-vehicle display apparatus according to claim 1, wherein the image output circuit displays the obstacle image at a size corresponding to an angle of view of the recognized obstacle viewed from the driver.

4. The in-vehicle display apparatus according to claim 1, wherein the image output circuit displays the obstacle image at a size corresponding to a height and width of the recognized obstacle.

5. The in-vehicle display apparatus according to claim 1, wherein the image output circuit variably sets a display position of the obstacle image in response to a distance between the vehicle and the recognized obstacle.

6. A program product stored in a non-transitory computer-readable storage medium, the program product comprising an instruction to function a computer as the image output circuit of claim 1, the computer being connected to a display portion that displays an image in a predetermined displayable range at a lower portion on a windshield of a vehicle and to an obstacle recognition circuit that recognizes an obstacle around the vehicle.

7. A program product stored in a non-transitory computer-readable storage medium, the program product comprising an instruction to function a computer as the obstacle recognition circuit and image output circuit of claim 1, the computer being connected to a display portion that displays an image in a predetermined displayable range at a lower portion on a windshield of a vehicle.

8. The in-vehicle display apparatus according to claim 1, wherein:
the predetermined displayable range is defined as a rectangular range that is fixed within the lower portion on the windshield.

9. The in-vehicle display apparatus according to claim 8, wherein
a line of sight of the driver viewing the recognized obstacle is prevented from intersecting with the fixed rectangular range fixed within the lower portion on the windshield.

10. The in-vehicle display apparatus according to claim 8, further comprising:
a storage storing a coordinate correspondence table that makes display coordinates on the display portion correspond to three-dimensional information indicating positions viewed ahead of the vehicle,
wherein:
the image output circuits
generates the three-dimensional information indicating a position of the recognized obstacle, and
calculates a display coordinate corresponding to the obstacle image corresponding to the recognized obstacle by referring to the coordinate correspondence table based on the generated three-dimensional information indicating the position of the recognized obstacle; and
the display portion displays the obstacle image based on the calculated display coordinate, making the obstacle image appear within the fixed rectangular range.

11. The in-vehicle display apparatus according to claim 1, wherein
in response to the obstacle recognition circuit recognizing, as the recognized obstacle around the vehicle, a different vehicle and extracting a color of the different vehicle,
the image output circuit displays an obstacle image corresponding to the different vehicle by making the obstacle image indicating the different vehicle have a similar color of the color of the different vehicle.

12. The in-vehicle display apparatus according to claim 11, wherein
in response to the obstacle recognition circuit recognizing a pedestrian as the recognized obstacle around the vehicle,
the image output circuit displays an obstacle image indicating the pedestrian by making the obstacle image corresponding to the pedestrian have a color darker than the color of the different vehicle.

13. The in-vehicle display apparatus according to claim 1, wherein
the obstacle recognition circuit extracts a type of the recognized obstacle around the vehicle, the type including a different vehicle around the vehicle;
upon the type of the recognized obstacle being extracted as the different vehicle, an obstacle image indicating the different vehicle is displayed by using a similar color of a color of the recognized obstacle whose type is extracted as the different vehicle.

14. The in-vehicle display apparatus according to claim 13, wherein
the obstacle recognition circuit further extracts a type of the recognized obstacle around the vehicle, the type including a pedestrian in addition to the different vehicle;
upon the type of the recognized obstacle being extracted as the pedestrian, an obstacle image indicating to the pedestrian is displayed by using a color darker than the color of the recognized obstacle whose type is extracted as the different vehicle.

15. An in-vehicle display apparatus mounted to a vehicle, comprising:
a display portion that displays images in a predetermined displayable range ahead of a driver's seat of the vehicle;
an obstacle recognition circuit that simultaneously recognizes, as a plurality of recognized obstacles, a plurality of obstacles ahead of the vehicle, the plurality of obstacles exhibiting a first relative positional relationship that is viewed from a driver on the driver's seat; and
an image output circuit that controls the display portion to display a plurality of obstacle images respectively indicating the recognized obstacles within the predetermined displayable range,
wherein:
the predetermined displayable range ahead of the driver's seat is defined as a rectangular range that is fixed within a lower portion of a windshield of the vehicle, the lower portion being a lower half of the windshield; and
within the fixed rectangular range, the displayed obstacle images are configured to exhibit a second relative positional relationship by being displayed relative to and overlapped with a line image displaying a reduced image of a road upon which the vehicle is traveling, the reduced image including at least one lane line of the road,
the second relative positional relationship beign formed by reducing and reproducing the first relative positional relationship of the recognized obstacles and (ii) the road upon which the vehicle is traveling that are viewed through the windshield above the displayed obstacle images.

16. The in-vehicle display apparatus according to claim 15, wherein
a line of sight of the driver on the driver's seat, the driver viewing each of the recognized obstacles, is prevented from intersecting with the fixed rectangular range fixed within the lower portion on the windshield.

17. The in-vehicle display apparatus according to claim 15, further comprising:
a storage storing a coordinate correspondence table that makes display coordinates on the display portion correspond to three-dimensional information indicating positions viewed ahead of the vehicle through the windshield,
wherein:
the image output circuits
generates the three-dimensional information indicating positions of the recognized obstacles, and
calculates display coordinates corresponding to the reduced obstacle images corresponding to the recognized obstacles by referring to the coordinate correspondence table based on the generated three-dimensional information indicating the positions of the recognized obstacles; and
the display portion displays the obstacle images based on the calculated display coordinates, making the obstacle images appear within the fixed rectangular range.

18. The in-vehicle display apparatus according to claim 15, wherein in response to the obstacle recognition circuit recognizing, as one of the recognized obstacle ahead of the vehicle, a different vehicle and extracting a color of the different vehicle, the image output circuit displays an obstacle image indicating the different vehicle by making the obstacle image indicating the different vehicle have a similar color of the color of the different vehicle.

* * * * *